United States Patent [19]

Karr et al.

[11] 4,277,974

[45] Jul. 14, 1981

[54] TIME-TEMPERATURE INDICATION

[76] Inventors: Lawrence J. Karr, 1349 W. Washington Blvd., Venice, Calif. 90291; Stanton H. Kaye, 108 S. Mansfield, Los Angeles, Calif. 90036

[21] Appl. No.: 56,955

[22] Filed: Jul. 12, 1979

[51] Int. Cl.³ ..................... G01K 3/04; G04F 13/04; G01R 11/44
[52] U.S. Cl. ..................... 73/339 R; 426/88
[58] Field of Search ............ 73/15 R, 339 R; 324/182, 94, 430, 431; 58/1 R; 340/309.1, 309.3; 429/90, 91; 204/195 R; 368/114, 107, 108; 426/87, 88

[56] References Cited

U.S. PATENT DOCUMENTS

| Re. 24,190 | 7/1956 | Kroko | 368/114 |
|---|---|---|---|
| 2,663,750 | 12/1953 | Paillet | 429/90 |
| 3,045,179 | 7/1962 | Maier | 324/182 |
| 3,102,425 | 9/1963 | Westman et al. | 73/15 R |
| 3,119,754 | 1/1964 | Blumenfeld et al. | 324/182 X |
| 3,167,961 | 2/1965 | Koch et al. | 73/356 |
| 3,336,212 | 8/1967 | Nicholas et al. | 73/358 X |
| 3,355,731 | 11/1967 | Jones, Jr. | 340/309.1 |
| 3,380,072 | 4/1968 | Groothius | 368/114 X |
| 3,518,501 | 6/1970 | Bissett et al. | 324/182 |
| 3,543,582 | 12/1970 | Sessler | 73/339 R |
| 3,688,296 | 8/1972 | Donohue et al. | 340/309.1 X |
| 3,773,563 | 11/1973 | Eaton, Jr. et al. | 429/91 |
| 3,855,506 | 12/1974 | Halasz et al. | 324/182 X |
| 4,057,029 | 11/1977 | Seiter | 116/207 |

FOREIGN PATENT DOCUMENTS 1261206  2/1968  Fed. Rep. of Germany ............ 429/90

Primary Examiner—Daniel M. Yasich
Attorney, Agent, or Firm—Benjamin DeWitt

[57] ABSTRACT

A time temperature indicator in the physical form of a substantially planar label-like member that can be placed on perishable products to give a visual indication of deterioration or spoilage of the product due to its exposure to temperature. The indicator includes a galvanic cell which serves both as power source and, by virtue of a partly consumable electrode, as an indicating coulometer, indicating charge transfer wherein the charge transferred is an electrical analog of the time integral of the deterioration rate of the product as a function of temperature; the analog of the deterioration rate is the current drawn from the cell when a device having a current drain which is an approximate exponential function of temperature is connected to the terminals of the cell. The visual indication is provided by the contrast of the prearranged pattern of a protected part of the consumable electrode against the electrolyte which becomes visible when the unprotected part of the electrode is consumed.

12 Claims, 6 Drawing Figures

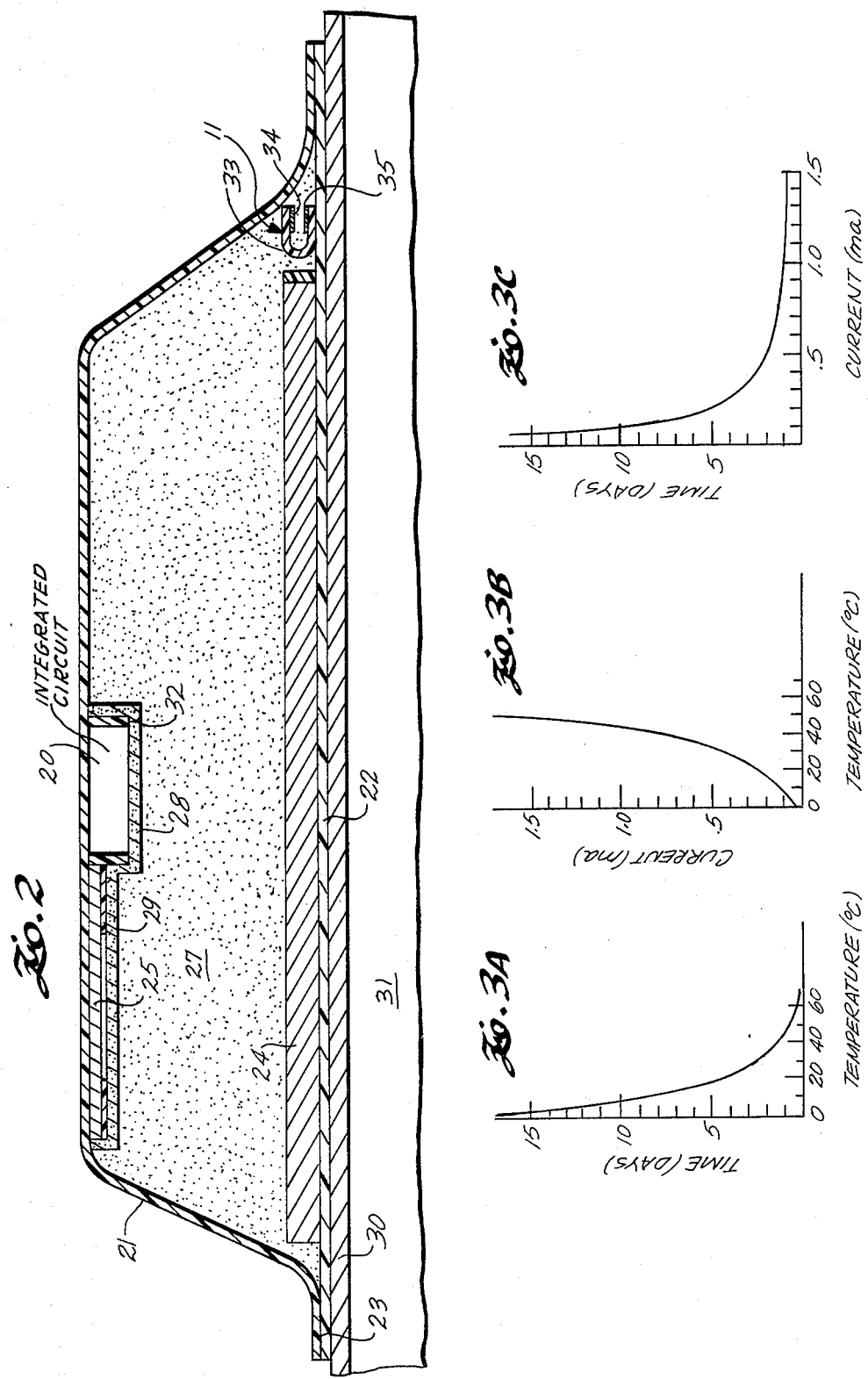

TIME-TEMPERATURE INDICATION

BACKGROUND OF THE INVENTION

This invention relates to time-temperature indication and, more particularly, to the development of a time-temperature indication by electrical means.

The shelf life of many products, including food, drugs, and film (photographic and x-ray), is determined by the ambient temperature to which the product is exposed. Generally, the higher the temperature, the lower the shelf life. Time-temperature indication by chemical means is known. An indicator material is separated from a reactant material for the indicator by a diffusion barrier. Passage of the reactant through the diffusion barrier depends upon the ambient temperature. In one such time-temperature indicator, disclosed in U.S. Pat. No. 3,967,579, the reactant has a clearly defined melting point at a preselected temperature; when the ambient temperature rises above the preselected value, the reactant melts and begins to flow through the diffusion barrier to the indicator. In another such time-temperature indicator, which is disclosed in U.S. Pat. No. 4,057,029, the diffusion barrier changes from an impermeable state to a permeable state at a clearly defined preselected temperature. In both the described devices, the rate of passage of the reactant above the preselected temperature is essentially independent of the ambient temperature, i.e., below the preselected temperature there is no passage of reactant, and above the preselected temperature there is passage at an almost constant rate. But, the shelf life of many products is a continuous, usually, an inverse exponential, function of ambient temperature—as the ambient temperature rises, the shelf life gradually decreases. Thus, the described time-temperature indicators do not adequately account for how much higher the ambient temperature is than the preselected temperature.

Another time-temperature indicator is disclosed in U.S. Pat. No. 2,782,749, and is based on the use of temperature sensitive materials having non-specific melting points, such as fats and waxes, which gradually become less viscous as temperature increases. These temperature sensitive materials are formed as a layer on a porous paper barrier and at or above a predetermined temperature, the fat or wax begins to diffuse through the paper barrier and eventually reaches a point of visibility on the opposite side of the barrier. The rate of diffusion of the material through the barrier is directly related to the temperature. Devices of this type, due to the nature of fats and waxes, have a relatively narrow temperature range at which they can be used and it is difficult to control the diffusion rate through the paper barrier. In addition, the paper barrier must be relatively thick, on the order of 0.75 inches, so that the device is relatively bulky, thus giving rise to handling and storage problems when attached to packages or containers.

SUMMARY OF THE INVENTION

The present invention accomplishes time-temperature indication by electrical means, namely, by generating an electrical current having an amplitude-temperature relationship that is proportional to the reciprocal of the time-temperature relationship of a characteristic of a substance to be monitored. The current is integrated to represent the generated charge. An indication is given when the generated charge reaches a predetermined value, to signal a change in the characteristic of the substance being monitored. By way of example, the change in the characteristic could represent spoilage of the substance being monitored; in such case the time-temperature relationship represents shelf life.

A feature of the invention is a time-temperature indicator comprising a galvanic cell having a pair of output terminals and a component that consumes itself as electrical current is drawn from the cell. A device having a temperature dependent current drain is connected between the output terminals. In effect, the consumed component of the cell serves as an integrator of the current drawn from the cell, which is dependent upon the temperature. An indicator is actuated when a predetermined percentage of the component is consumed. Preferably, the consumed component of the cell is one of its electrodes, the indicator comprises a window covering one side of the consumable electrode and a patterned mask covering portions of the other side of the consumable electrode. When the portions of the electrode covered by the mask are completely consumed, the electrolyte becomes visible through the window.

Thus, the invention permits a continuous time-temperature measurement to be made that precisely matches the relationship between product characteristics, such as shelf life, and temperature. It is contemplated that time-temperature indicators embodying the invention can be mass produced at very low cost by using existing integrated circuit technology and related manufacturing techniques.

BRIEF DESCRIPTION OF THE DRAWINGS

The features of specific embodiments of the best mode contemplated of carrying out the invention are illustrated in the drawings, in which:

FIG. 2 is a side sectional view of a product package including a time-temperature indicator incorporating the principles of the invention;

FIGS. 3A, 3B, and 3C are graphs depicting the current, temperature, and time relationships upon which the invention is based.

DETAILED DESCRIPTION OF THE SPECIFIC EMBODIMENTS

Figure 1:
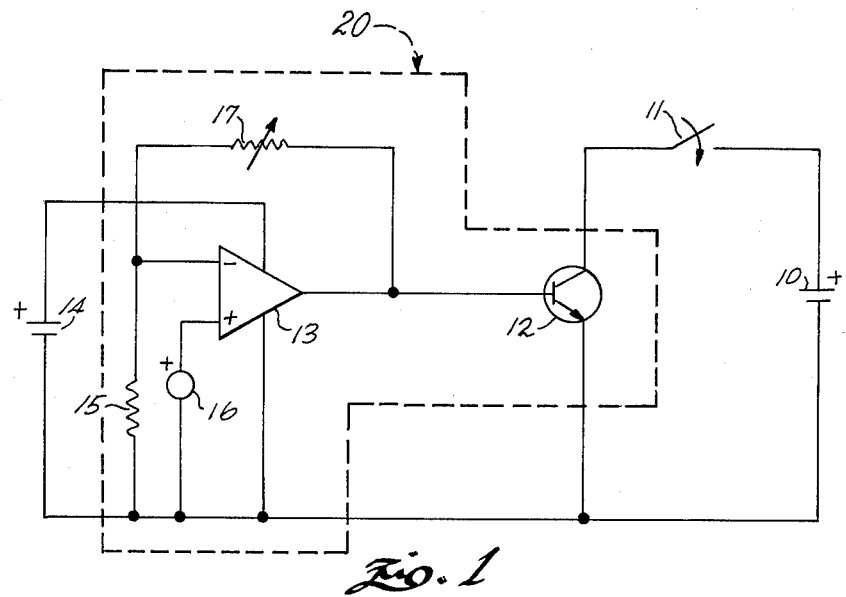
FIG. 1 is a schematic circuit diagram of a time-temperature indicator incorporating the principles of the invention.

In FIG. 1, a so-called Leclanche cell 10, has a consumable zinc anode, a carbon cathode, an ammonium chloride electrolyte, a positive output terminal connected to the carbon electrode, and a negative output terminal connected to the zinc electrode. The zinc electrode has a known mass, and therefore a known number of zinc atoms available for ionization, i.e., charge capacity. (The charge capacity of one gram of zinc is 0.81 ampere-hours.) The positive output terminal of cell 10 is directly connected by a normally open, manually operable switch 11 to the collector of an NPN transistor 12. The negative output terminal of cell 10 is directly connected to the emitter of transistor 12. Transistor 12 is completely untemperature compensated, and its collector-to-emitter current, and thus the current drawn from cell 10, is a function of temperature, as called for by the well known junction transistor equation. An operational amplifier 13 has an output connected to the base of transistor 12. A battery 14, which could also comprise a Leclanche cell, or other type of galvanic cell, has output terminals connected to the power supply inputs to operational amplifier 13. The charge capacity of battery 14 is large enough to supply power until the zinc electrode of cell 10 is consumed. (If battery 14 is a Leclanche cell, its components including the zinc electrode are sufficiently large as not to be consumed before the zinc electrode of cell 10.) A resistor 15 is connected between the negative input of operational amplifier 13 and the negative output terminal of battery 14. A source of positive reference voltage 16, which is a source of voltage having a very constant magnitude for all temperature and load conditions, is connected between the positive input of operational amplifier 13 and the negative output terminal of battery 14. An adjustable feedback resistor 17 is connected from the output of operational amplifier 13 to its negative input. After switch 11 is closed, current is drawn from cell 10 through transistor 12. The constant reference voltage from source 16 is amplified by operational amplifier 13, which serves to present a very low, almost zero, source impedance to transistor 12. By virtue of the constant base-to-emitter bias across transistor 12, the current drawn from cell 10 is a function of the ambient temperature and, more particularly, a direct exponential function thereof. When current is drawn from cell 10, its zinc electrode is consumed. As the ambient temperature increases, the current drawn from cell 10 increases and the time interval until the zinc electrode is consumed decreases. Thus, the zinc electrode of cell 10 functions as a coulombmeter, integrating the temperature dependent current drawn from cell 10. When a certain percentage of the zinc electrode is consumed an indication is given, for example, in the manner described below in connection with FIG. 2.

In one embodiment, transistor 12 is a 2N3904 type transistor; operational amplifier 13 including source 16 is a monolithic linear integrated circuit (National Semiconductor LM10/LM10B (L)/LM10C(L) Op Amp and Voltage Reference wherein one of the two operational amplifiers is used as element 13 (FIG. 1), and the other operational amplifier is unutilized, the output terminals of battery 14 are connected to pins 7 and 4, respectively, the junction of resistors 15 and 17 is connected to pin 8, and the base of transistor 12 is connected to pin 1); source 16 is 200 millivolts; battery 14 is 1.4 volts, resistor 15 is 100,000 ohms, and resistor 17 varies between 180,000 and 270,000 ohms.

In FIG. 2, transistor 12, operational amplifier 13, source 16, and resistors 15 and 17 are incorporated into an integrated circuit as indicated by the dashed-line box 20 in FIG. 1. Sheets of transparent film 21 and 22, of a suitable dielectric material such as Mylar, of the order of 1 mil thick have contiguous peripheral edges that are joined together by a heat seal 23 to form a completely closed envelope for the time-temperature indicator. In addition to integrated circuit chip 20, this envelope contains a carbon electrode 24, a zinc electrode 25, an electrolyte 27, a separator 28, an indicator 29, and switch 11. Sheet 22 is secured by adhesive or the like to a package 30 for a product 31, such as food, photographic or x-ray film, or drugs. In one embodiment, electrode 24 comprises a graphite-loaded, vinyl sheet in the order of 3 mils thick, electrode 25 comprises a sheet of pure zinc 1 mil thick, electrolyte 27 comprises a black pasty mixture of manganese dioxide, zinc chloride, ammonium chloride, and water in the order of 40 mils thick, separator 28 comprises a layer of porous paper in the order of 1 mil thick, and indicator 29 is a patterned mask or resist of material impervious to electrolyte 27, such as waterproof ink, in the order of 0.5 mils thick. Thus, the assembly takes the physical form of a substantially planar label-like member that can be attached to a perishable product or its container. Electrode 24 is secured to the inside of sheet 22, electrode 25 is secured to the inside of sheet 21, and electrolyte 27 fills the space between the electrodes. Indicator 29 is coated on the surface of electrode 25 opposite sheet 21. Indicator 29 is a patterned mask in the sense that it forms an outline or negative image of letters such as "SPOILED", "CONTAMINATED", "REJECT", or other symbols communicating that the shelf life of product 31 has been exceeded. As current is drawn by transistor 12 (FIG. 1), the portions of electrode 25 not covered by indicator mask 29 are consumed, leaving the masked portions thereof intact. The portion of sheet 21 contiguous to electrode 25 serves as a window. Since electrode 25 is between this window and the electrolyte, it blocks the electrolyte from view until its unmasked portions are completely consumed. When the unmasked portions of electrode 25 are completely consumed, the electrolyte is exposed to view through the electrode 25 to provide a visual indication, for example a set of letters, corresponding to the pattern of these unmasked portions. The background or contrast for these letters or other visual indication is the zinc remaining at the masked portions of electrode 25. It will be understood, of course, that the area of the unmasked portion of electrode 25 is designed to encompass a quantity of metal corresponding to that quantity which will be completely eroded by a through-put current integral corresponding to a predetermined degree of aging or deterioration of the perishable product. Thus, there is provided a predetermined visual display to indicate that the time integral of the product's aging rate has reached a predetermined value. It is important that electrode 25 have uniform thickness so all the letters outlined by the patterned layer become visible at about the same time. Integrated circuit chip 20 lies adjacent to electrode 25 and is electrically isolated therefrom by an insulator 32. Separator 28 envelopes electrolyte 27, electrode 25, indicator 29, and integrated circuit chip 20 for the purpose of preventing internal short circuits within the cell. Switch 11 comprises a U-shaped strip 33 of permanently deformable, electrically isolative material inside the closed envelope. Flat electrical conductors 34 and 35 are bonded on the inside, i.e., the facing surfaces of the legs of strip 33. Switch 11 is closed by pressing the right side of sheets 21 and 22, as viewed in FIG. 2, together to permanently deform strip 33, leaving conductors 34 and 35 in contact with each other. Alternatively, switch 11 could be located outside the closed envelope and connected to the circuitry by lead in wires passing through heat seal 23. Battery 14 could also be located inside or outside the closed envelope, in the latter case connected to the circuitry by lead in wires passing through the heat seal. While the electrical connections between integrated circuit chip 20, electrode 24, electrode 25, battery 14, and switch 11 are not shown in FIG. 2, it will be understood that a pair of interconnecting wires extend respectively from conductor 34 to the collector of transistor 12, within integrated circuit 20, and from conductor 35 to carbon electrode 24. Further, it will be understood that the assembly, shown in cross-section in FIG. 2, is to be otherwise wired to implement circuit interconnections consistent with FIG. 1. Electrode 25, electrode 24, and electrolyte 27 comprise cell 10 (FIG. 1). Electrode 25 has a known mass of unmasked zinc so that it contains a known number of zinc atoms available for ionization. As a result, electrode 25 is consumed after a corresponding known electrical charge has been drawn from cell 10 through transistor 12 (FIG. 1).

The graph of FIG. 3A depicts a typical shelf life, i.e., time interval in days, as a function of ambient temperature in degrees centigrade. For equal increments of increasing temperature, the shelf life is reduced by a constant factor, e.g., for each 10° C. increase in ambient temperature the shelf life is halved. In general, the relationship between time and temperature of a product can be expressed by the equation $$\tau = Ae^{-kT} \quad (1)$$

where $\tau$ is the time interval, i.e., shelf life, T is ambient temperature, A is a coefficient, and k is the constant representing the constant factor of reduction, i.e., the decay in shelf life.

The graph of FIG. 3B depicts the current in milliamperes drawn from cell 10 as a function of ambient temperature in degrees centigrade. This graph is the reciprocal of the graph of FIG. 3A. In other words, the time-temperature indicator is designed so for equal increments of increasing temperature, current drawn from cell 10 increases by the same factor as the shelf life decreases. Thus, if for each 10° C. increase in ambient temperature, the shelf life is halved, the current drawn from cell 10 doubles. In general, the relationship between the current drawn from cell 10 and temperature can be expressed by the equation $$i = Be^{kT} \quad (2)$$

where i is the current, B is a coefficient, and T and k are as defined above. Comparison of equations (1) and (2) set forth above illustrates that the relationship between current and temperature is proportional to the reciprocal of the relationship between time and temperature, the constant of proportionality being determined by the coefficients A and B.

The graph of FIG. 3C depicts the time interval in days required to consume the zinc electrode of cell 10 as a function of the current drawn from cell 10 in milliamperes. It can be seen that as the current increases with ambient temperature, the time interval decreases to simulate the time-temperature relationship of the product characteristic. The value of coefficient B is given by the equation $$B = (Q/\tau)e^{-kT_R} \quad (3)$$

where $T_R$ is room temperature, Q is the charge capacity of the zinc electrode, $\tau$ is the shelf life of the product at room temperature, and k is, as defined above, the decay in shelf life. In the circuit of FIG. 1, coefficient B is set by varying resistor 17. In the example shown graphically in FIGS. 3A, 3B, and 3C, it is assumed that k is 0.0693 and Q is 0.024 ampere hours.

Figure 4:
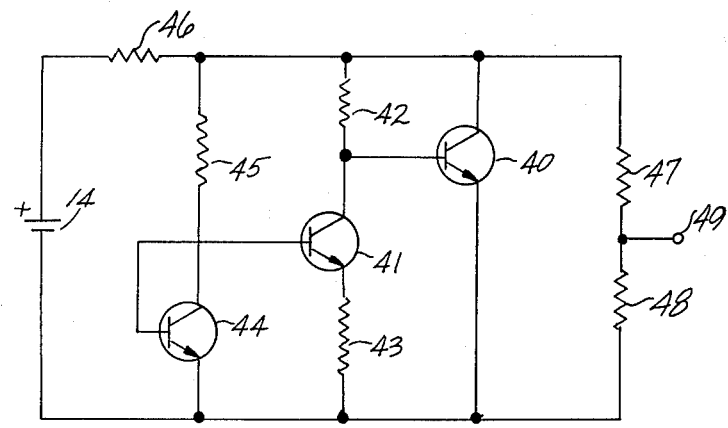
FIG. 4 is a schematic circuit diagram of an alternative version of a voltage reference source, which permits variation of the relationship between the current generated by the circuit of FIG. 1 and the ambient temperature.

When source 16 provides a constant reference voltage of 200 millivolts and transistor 12 is a 2N3904, k is approximately 0.0693, i.e., for each 10° C. increment of temperature increase the current doubles. Other values of k can be provided by substituting for source 16 in FIG. 1, the source of reference voltage shown in FIG. 4, which is a conventional band gap reference circuit. A transistor 40 has a collector connected to the positive terminal of battery 14 by a resistor 46 and an emitter directly connected to the negative terminal of battery 14. A transistor 41 has a collector connected by a resistor 42 to the collector of transistor 40 and an emitter connected by a resistor 43 to the negative terminal of battery 14. The collector of transistor 41 is also directly connected to the base of transistor 40. A transistor 44 has a collector connected by a resistor 45 to the collector of transistor 40 and an emitter directly connected to the negative terminal of battery 14. The bases of transistor 41 and 44 are directly connected together. A voltage divider is formed by resistors 47 and 48 connected in series between the collector and emitter of transistor 40. An output terminal 49 at the junction of resistors 47 and 48 is connected to the positive input of operational amplifier 13. The relationship between the voltage between the collector and emitter of transistor 40 and the temperature depends upon the resistance ratio of resistors 42 and 43. This voltage is nominally 1.2 volts. This voltage is reduced to the reference voltage of nominally 200 millivolts by the described voltage divider. For example, if the resistance ratio is a given value, the reference voltage is constant, i.e., independent of temperature; if the resistance ratio is less than the given value, the reference voltage varies inversely with ambient temperature; and if the resistance ratio is greater than the given value, the reference voltage varies directly with ambient temperature. Thus, by providing a resistance ratio that is larger than the given value, k can be increased, i.e., the exponential rise of current drawn from cell 10 can be increased, and by providing a resistance ratio smaller than the given value, k can be decreased to match the time-temperature characteristics of the particular product in a reciprocal manner.

The described embodiments of the invention are considered to be preferred and illustrative of the inventive concept; the scope of the invention is not to be restricted to such embodiments. Various and numerous other arrangements may be devised by one skilled in the art without departing from the spirit and scope of this invention. For example, other consumable components of the battery, such as the cathode or the electrolyte, may be used to measure charge, although the anode of the zinc-carbon battery is preferred because of the precision charge measurement that is attainable. Further, other types of galvanic cells, either primary or secondary, dry or wet, could be employed to measure charge. Instead of a transistor, a thermistor or other temperature responsive device could be used as the temperature dependent current drain. The invention also contemplates the use of other types of coulombmeters in place of a galvanic cell, although the use of a galvanic cell in the manner described advantageously serves both to measure and indicate charge by virtue of the unmasking of the electrolyte when the zinc electrode is consumed. Use of a consumable component, particularly an electrode of a primary cell as the charge measuring device, is also advantageous because of its simplicity and ease of mass production.

What is claimed is:

1. An apparatus for indicating the deterioration of a packaged perishable product that deteriorates at a rate approximately exponentially related to the temperature of the product, the apparatus being adapted to be attached to the package in which said product is contained and comprising:
  (a) a substantially planar, label-like, galvanic cell having a consumable electrode, an electrolyte, and a patterned mask positioned between said electrode and the electrolyte and protecting a predetermined portion of said electrode against galvanic erosion to provide a predetermined visual indication when the time integral of the instantaneous currents passed through said cell amounts to a predetermined coulombic total, and
  (b) circuit means including a semiconductor device having a temperature dependent current characteristic connected to said cell for controlling the through-put current in a manner such that the instantaneous current amplitude at any given time is a direct and substantially exponential function of the temperature at such time, with said function substantially corresponding to the time rate of deterioration as a function of temperature characteristic of the perishable product to which the apparatus is to be attached, whereby said through-part current consumes that portion of the consumable electrode not protected by said patterned mask, exposing the electrolyte to view through said electrode and providing a visual indication corresponding to the pattern of said mask.

2. The apparatus of claim 1 in which said circuit means comprises:
  (a) a transistor having its collector and emitter electrodes connected in a series circuit with said galvanic cell and having a current drain characteristic such that the collector current is a substantially exponential function of temperature over the temperature range to which the perishable product is likely to be exposed, and
  (b) bias-circuit means for applying a substantially constant forward bias voltage to the base-emitter circuit of said transistor of a magnitude such that said current characteristic is adjusted to substantially correspond to the deterioration rate characteristic, as a function of temperature, of said packaged product.

3. The apparatus of claim 1 in which said circuit means comprises:
  (a) a transistor having its collector and emitter electrodes connected in a series circuit with said galvanic cell and having a current drain characteristic such that the collector current is a substantially exponential function of temperature over the temperature range to which the perishable product is likely to be exposed, and
  (b) bias-circuit means connected between the emitter and base electrodes for applying a forward control voltage which varies as a preselected function of temperature for adjusting said current drain characteristic to substantially correspond to the deterioration-rate-as-a-function-of-temperature characteristic of said packaged product where the deterioration rate at each temperature is the reciprocal of the shelf life of the product at that same temperature.

4. The apparatus of claim 3 in which selected portions of the consumable electrode are separated from the electrolyte by a layer of electrolyte-resistive material disposed on the consumable electrode in a predetermined pattern such that upon complete erosion of the unmasked portions of the consumable electrode the electrolyte becomes visible through said unmasked portions to provide a visual indication corresponding to said predetermined pattern.

5. The apparatus of claim 3 wherein the galvanic cell functions simultaneously as a current integrator, an indicating pattern display mechanism, and a power source for energizing the collector-to-emitter circuit of said transistor.

6. The apparatus of claim 3 wherein said bias-circuit means applies a forward bias voltage to the base electrode of said transistor, with said bias voltage varying as a function of temperature sufficiently for causing the collector-current-versus-temperature characteristic to substantially correspond to the deterioration rate-as-a-function-of-temperature characteristic of the perishable product.

7. The apparatus of claim 3 wherein said bias-circuit means applies a forward bias voltage to the base of said transistor, with said bias voltage varying as a predetermined function of temperature selected for causing the collector current to vary as a function of temperature in substantially the same manner that the deterioration rate of the perishable product varies as a function of temperature.

8. The apparatus of any one of claims 3 through 7 in which said galvanic cell provides the electromotive force for energizing the emitter-to-collector circuit of said transistor.

9. The apparatus of claim 7 in which said bias voltage varies as an increasing function of temperature.

10. The apparatus of claim 7 in which said bias voltage varies as a decreasing function of temperature.

11. The apparatus of either claim 1 or claim 3 in which one electrode of the galvanic cell is zinc, the other electrode is carbon, and the electrolyte includes manganese dioxide, zinc chloride and ammonium chloride.

12. The apparatus of any one of claims 1 or 3 wherein the several elements of the apparatus are constructed and arranged to form a planar assembly having a thickness of about 0.05 inches or less and with the length and width both being at least an order of magnitude greater than the thickness.

* * * * *